(12) United States Patent
Crounse

(10) Patent No.: US 6,767,053 B1
(45) Date of Patent: Jul. 27, 2004

(54) ALL TERRAIN VEHICLE BACK SUPPORT

(76) Inventor: Bruce Crounse, P.O. Box 28275, Las Vegas, NV (US) 89126

( * ) Notice: Subject to any disclaimer, the term of this patent is extended or adjusted under 35 U.S.C. 154(b) by 0 days.

(21) Appl. No.: 10/427,188

(22) Filed: Apr. 30, 2003

Related U.S. Application Data
(60) Provisional application No. 60/403,758, filed on Aug. 15, 2002.

(51) Int. Cl.$^7$ ................................................ B60N 2/02
(52) U.S. Cl. .................................. 297/215.12; 297/383
(58) Field of Search ....................... 297/215.11, 215.12, 297/383, 352

(56) References Cited

U.S. PATENT DOCUMENTS

| 447,088 | A | * | 2/1891 | Sutton ..................... 273/108.31 |
|---|---|---|---|---|
| 3,698,762 | A | * | 10/1972 | Gorman ................... 297/215.12 |
| 3,822,917 | A | * | 7/1974 | George .................... 297/215.12 |
| 4,030,750 | A | * | 6/1977 | Abram ......................... 297/375 |
| 4,032,189 | A | | 6/1977 | Benavente et al. |
| 4,085,968 | A | | 4/1978 | Svensson et al. |
| 4,186,937 | A | * | 2/1980 | Schultz ..................... 280/304.4 |
| 4,570,998 | A | * | 2/1986 | Hughes ....................... 297/353 |
| 5,314,239 | A | | 5/1994 | Edwards et al. |
| 5,441,330 | A | * | 8/1995 | Rojas .......................... 297/383 |
| 5,518,291 | A | * | 5/1996 | Shaide .................... 297/215.12 |
| 5,553,915 | A | | 9/1996 | Stamatakis |
| 5,765,917 | A | | 6/1998 | Johnson |
| 6,105,721 | A | | 8/2000 | Haynes |
| 2002/0011745 | A1 | * | 1/2002 | Petersen ................ 297/215.11 |

* cited by examiner

*Primary Examiner*—Peter M. Cuomo
*Assistant Examiner*—Joseph Edell
(74) *Attorney, Agent, or Firm*—Robert Ryan Morishita; Anderson & Morishita, LLC

(57) ABSTRACT

A back support for an ATV having a seat in front of a rear rack includes a base secured to the rear rack and attached to a back support through a rail. Optionally, a rail support connects to the base to the rail and a bracket attaches the back support to the rail. The angle, and optionally the height, of the back support with respect to the base is selectively adjustable, optionally over a continuous range, by changing the location where the rail attaches to the rail support. Optionally, the spacing between the back support and seat is selectively adjustable, optionally over a continuous range, by changing the location where the bracket attaches to the rail. Optionally, the base is held to the rear rack using float mounts positioned over the base and fasteners. Optionally, grip handles are attached to the base using grip mounts disposed thereon.

19 Claims, 7 Drawing Sheets

ALL TERRAIN VEHICLE BACK SUPPORT

RELATED APPLICATION DATA

The present application claims the priority of U.S. Provisional Application Serial No. 60/403,758 entitled "Best Ride A.T.V. Backrest/Support" filed Aug. 15, 2002 by Applicant herein.

FIELD OF THE INVENTION

The present invention relates generally to all terrain vehicle back supports. More specifically, the present invention is an all terrain vehicle back support that secures to the rear rack of an all terrain vehicle.

BACKGROUND OF THE INVENTION

It is well known that most all terrain vehicles, or ATVs, do not generally include a back support for the rider. However, it is also known that for many reasons, back supports are desirable. Thus, prior art devices have been created to retroactively add a back support to an ATV For example, Johnson, U.S. Pat. No. 5,765,917, discloses a plate holding a back rest for an ATV. However, the back rest and plate disclosed are not adjustable in height or angle. This lack of height adjustment, along with the position of the back rest with respect to the seat, may prevent the rider from adjusting the back rest forward beyond the seat. That is, the back rest of Johnson might be unable to move forward past a raised seat.

Another prior art device is shown in Edwards et al., U.S. Pat. No. 5,314,239, which discloses a back rest that attaches to the top plate of an ATV. Like Johnson, Edwards' device is not adjustable in height or angle.

SUMMARY OF THE INVENTION

The present device is directed for use with an all terrain vehicle ("ATV") of the type having a seat in front of a rear rack. The device includes a base secured to the rear rack. In one embodiment, the base is secured to the rear rack using float mounts selectively positionable over the base and fasteners securing the float mounts to the rear rack to thereby hold the base to the rear rack. A rail support is fixed to the base. A rail is attached to the rail support.

The device also includes a back support. The back support attaches to the rail. Optionally, a bracket is fixed to the back support and the back support is attached to the rail through the bracket.

The angle, and optionally the height, of the back support with respect to the base, and thus the rear rack, is adjustable. To this end, in an optional embodiment, the rail is attachable to the rail support at a plurality of locations such that the height and angle of the back support with respect to the base is selectively adjusted by changing the location at which the rail attaches to the rail support. For example, the rail may be attachable to the rail support in at least two discrete locations, such as through spaced apertures, or along a continuous range of locations, such as through a slot. In such an optional embodiment, fasteners, such as pins, detent ring pins, bolts, or the like may be used to attach the rail to the rail support.

In a further optional embodiment, the spacing between the seat and the back support may also be selectively adjusted. In an optional embodiment including a bracket fixed to the back support, the rail may be attachable to the bracket at a plurality of locations such that the spacing between the back support and the seat is selectively adjusted by changing the location at which the rail attaches to the bracket. As with the attachment between the rail and rail support, the bracket and rail may be attached to one another in at least discrete locations, such as through spaced apertures, or over a continuous range of locations, such as through a slot. In such an optional embodiment, fasteners, such as pins, detent ring pins, bolts, or the like may be used to attach the rail to the bracket.

In yet a further optional embodiment, the device of the present invention may further include a hand grip. Such an optional embodiment may include a grip mount attached to the base and a grip handle attached to the grip mount.

DESCRIPTION

Figure 1:
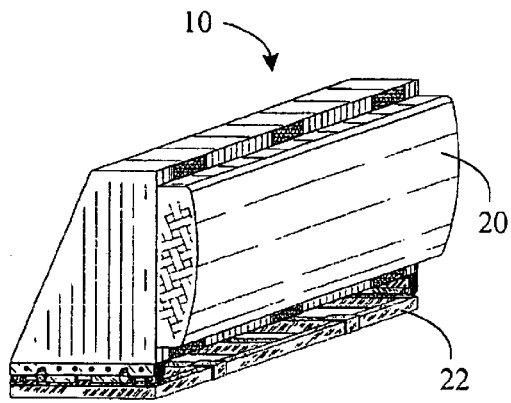
FIG. 1 is an elevated front view of a back support according to an embodiment of the present invention.
Figure 2:
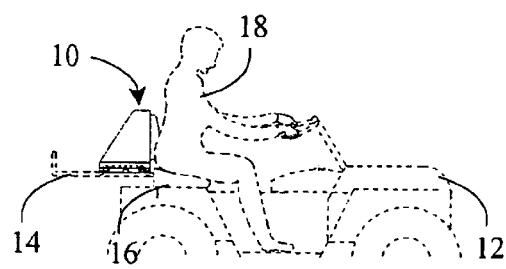
FIG. 2 is a side view of a back support according to the embodiment of FIG. 1 mounted on an ATV with an ATV and rider shown in broken lines.
Figure 3:
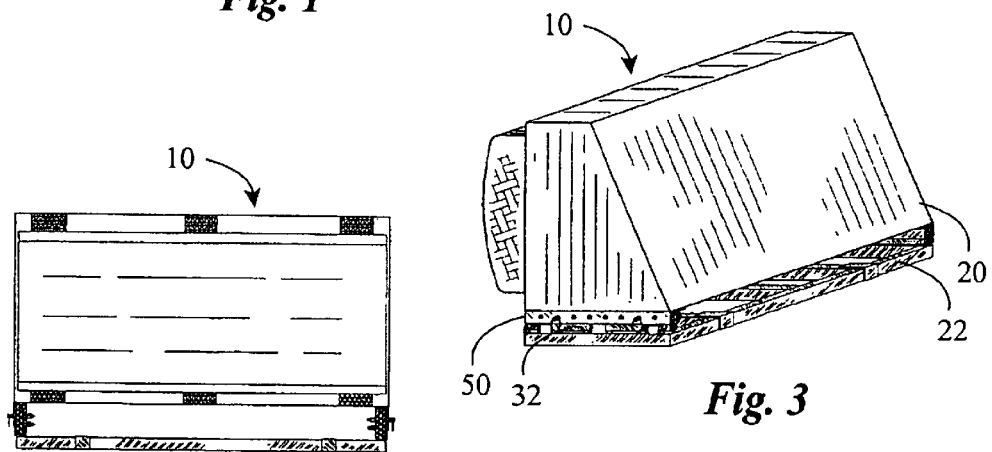
FIG. 3 is an elevated rear view of a back support according to the embodiment of FIG. 1.
Figure 4:
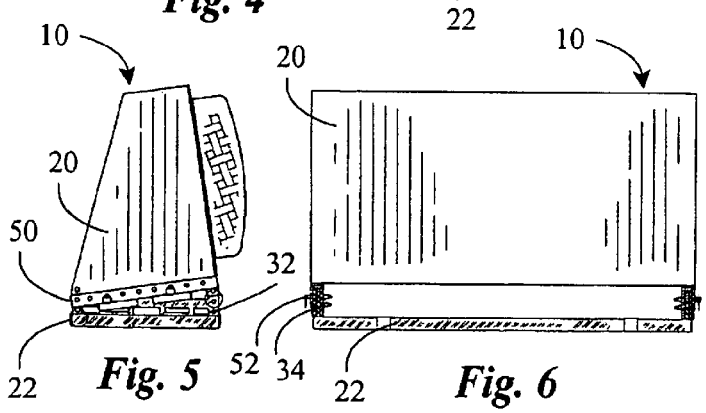
FIG. 4 is a front view of a back support according to the embodiment of FIG. 1.

Reference is now made to the figures wherein like parts are referred to by like numerals throughout. Referring first to FIGS. 1 and 2, device 10 of the present invention is directed for use with an all terrain vehicle ("ATV") 12 of the type including a rear rack 14 disposed behind a seat 16 for a rider 18. Generally, the present invention includes a back support 20 attached to a base 22 which, in turn, is attached to the rear rack 14.

Figure 10:
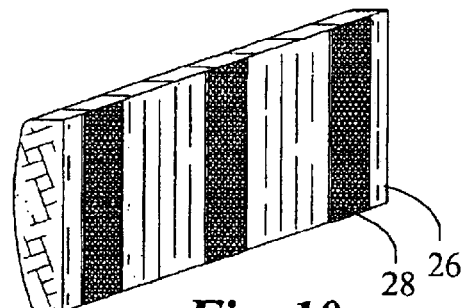
FIG. 10 is an elevated rear view of a cushion according to the embodiment of FIG. 9.
Figure 11:
FIG. 11 is a top view of a cushion according to the embodiment of FIG. 9.
Figure 12:
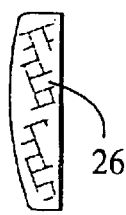
FIG. 12 is a left view of a cushion according to the embodiment of FIG. 9.
Figure 13:
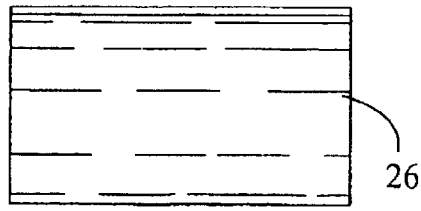
FIG. 13 is a front view of a cushion according to the embodiment of FIG. 9.
Figure 14:
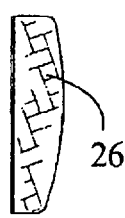
FIG. 14 is a right view of a cushion according to the embodiment of FIG. 9.

Referring to FIGS. 8–14, the back support 20 optionally includes a secondary cushion 26 attached to a primary cushion 24. While the primary cushion 24 could be formed from any material, in an optional embodiment, the primary cushion 24 is formed from a foam material that is firm enough to provide support but not so rigid that it creates a hazard to the driver. Similarly, the secondary cushion 26 could be formed from any material but in an optional embodiment, the secondary cushion 26 is a soft material foam or batting material. Optionally, the secondary cushion 26 is releasably attached to the primary cushion 24 using releasable fasteners such as mechanical fasteners, adhesive, or hook and pile fasteners 28 as shown in FIG. 10. In an optional embodiment shown in FIG. 8, the secondary cushion 26 is adjustable in position relative the primary cushion 24.

The base 22 could be solid or a frame. In the optional embodiment of FIG. 15, the base 22 is a rectangular frame formed from square tube. The base 22 is optionally smaller than the rear rack 14 to allow use of the rear rack 14 while the base 22 is mounted thereon.

It is contemplated that the back support 20 could be attached to the base 22 in many different ways. For example, the back support 20 could be directly attached to the base 22. By adjusting the location at which the back support 20 and base 22 attach, the angle of the back support 20 with respect to the base 22 can be selectively adjusted. In a further optional embodiment, the height of the back support 20 with respect to the base 22 can also be selectively adjusted.

In an alternate optional embodiment, the back support 20 is attached to the base 22 through a rail 30. That is, the back support 20 is attached to a rail 30 which, in turn, is attached to the base 22. As shown in FIGS. 15–20, the base 22 is attached to the rail 30 by using a rail support 32 fixed to the base 22, such as by welding, that mates with a U-shaped rail 30. The rail 30 is then attached to the rail support 32 using a fastener, such as a bolt, pin, detent ring pin 34, or other fastener.

Figure 5:
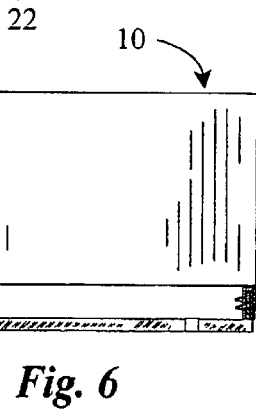
FIG. 5 is a right view of a back support according to the embodiment of FIG. 1 adjusted to tilt toward the rear.
Figures 6, 7:
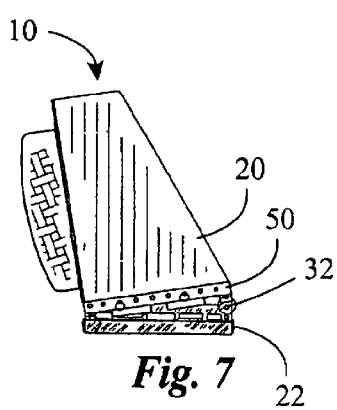
FIG. 6 is a rear view of a back support according to the embodiment of FIG. 1.
FIG. 7 is a left view of a back support according to the embodiment of FIG. 1 adjusted to tilt toward the front.
Figure 8:
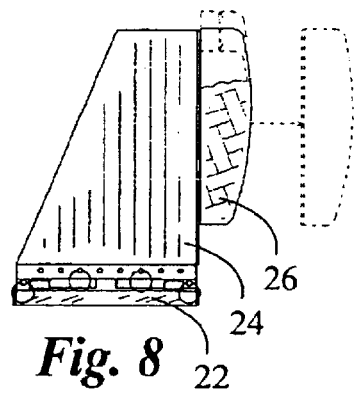
FIG. 8 is a right view of a back support according to the embodiment of FIG. 1 with an optional removable and adjustable cushion shown in broken lines.
Figure 9:
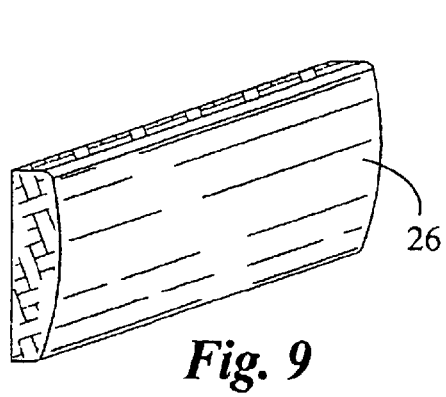
FIG. 9 is an elevated front view of a cushion according to an embodiment of the present invention.

To enable selective adjustment of the angle of the rail 30, and thus the back support 20, with respect to the base 22, the rail 30 and rail support 32 may be attachable in a plurality of locations. For example, in the embodiment of FIG. 16, a series of discrete spaced rail support holes 36 may be provided. As shown in FIGS. 5 and 7, by aligning rail angle adjustment holes 38 with the various rail support holes 36, and securing with a fastener 34, the angle of the back support 20 with respect to the base 22 may be selectively adjusted. It should be noted that the same structure also allows selective adjustment of the height of the back support 20 above the base 22.

Figure 20:
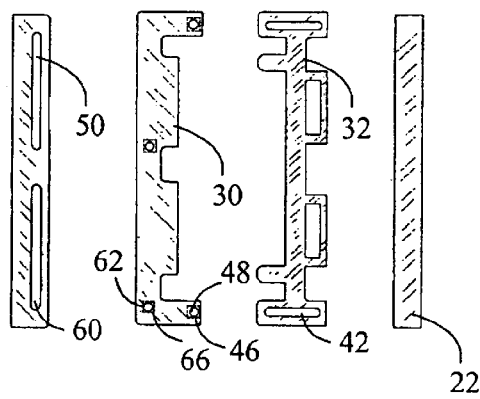
FIG. 20 is a side assembly view of a base, rail support, rail, and bracket according to the embodiment of FIG. 19.
Figure 19:
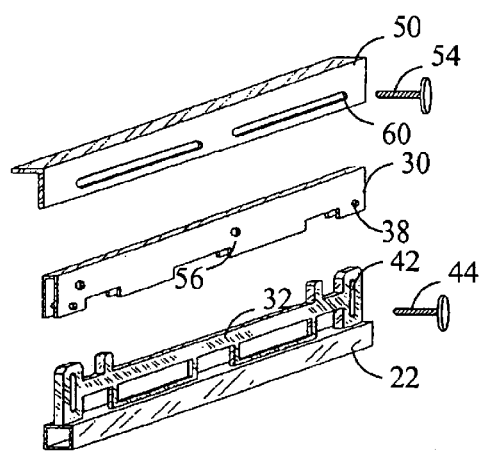
FIG. 19 is an elevated sectional assembly view of a base, rail support, rail, and bracket according to an alternate embodiment of the present invention.

In an alternate embodiment, shown in FIGS. 19–20, the rail 30 and rail support 32 may be attachable over a range of locations such using as a slot 42 in the rail support 32 engaging fasteners, such as pins, bolts, screw knobs 44 cooperating with a fixed nut 46, or the like, through a hole 48 in the rail 30 to hold the rail 30 at a desired angle with respect to the base 22. Such an optional embodiment would permit a continuous range of adjustment of the back support 20 angle by loosening the fastener thereby permitting movement of the back support 20 relative to the base 22 then tightening the fastener. It should also be appreciated that such an optional embodiment would also permit a continuous range of adjustment of the height of the back support 20 with respect to the base 22.

Figure 15:
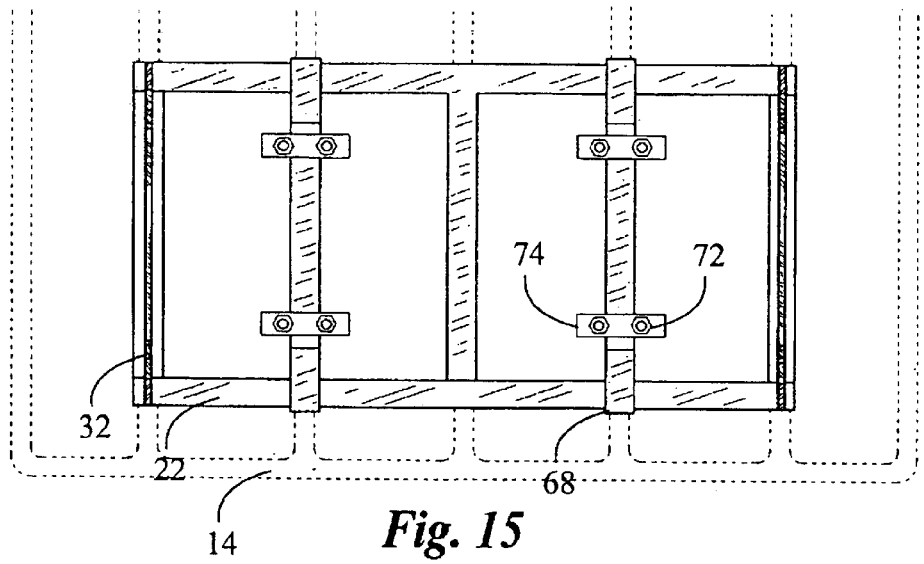
FIG. 15 is a top view of a base according to an embodiment of the present invention.
Figure 17:
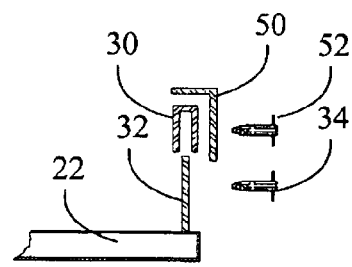
FIG. 17 is a front assembly view of a base, rail support, rail, and bracket according to the embodiment of FIG. 16.
Figure 18:
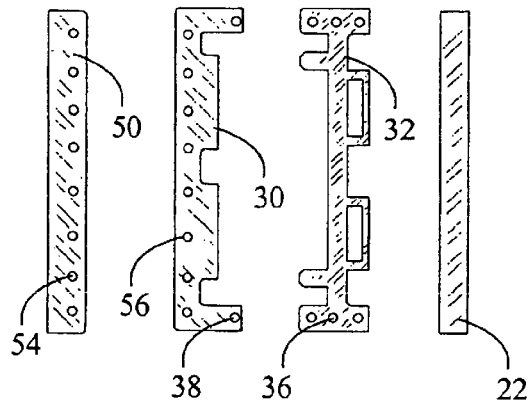
FIG. 18 is a side assembly view of a base, rail support, rail, and bracket according to the embodiment of FIG. 16.
Figure 16:
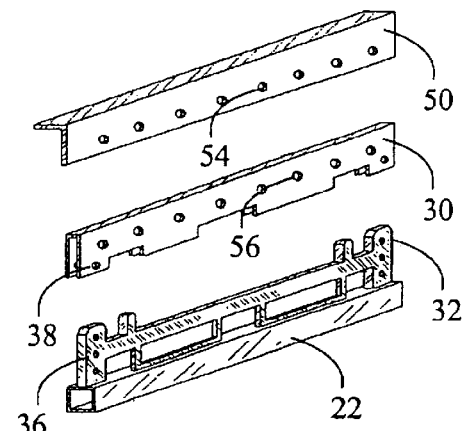
FIG. 16 is an elevated sectional assembly view of a base, rail support, rail, and bracket according to an embodiment of the present invention.

Turning now to the connection between the rail 30 and the back support 20, in an optional embodiment, shown in FIGS. 15–17, a bracket 50 is fixed to the back support 20. Optionally, the bracket 50 is L-shaped. The bracket 50 is attached to the rail 30 using a fastener, such as a bolt, pin, detent ring pin 52, or other fastener.

Figure 24:
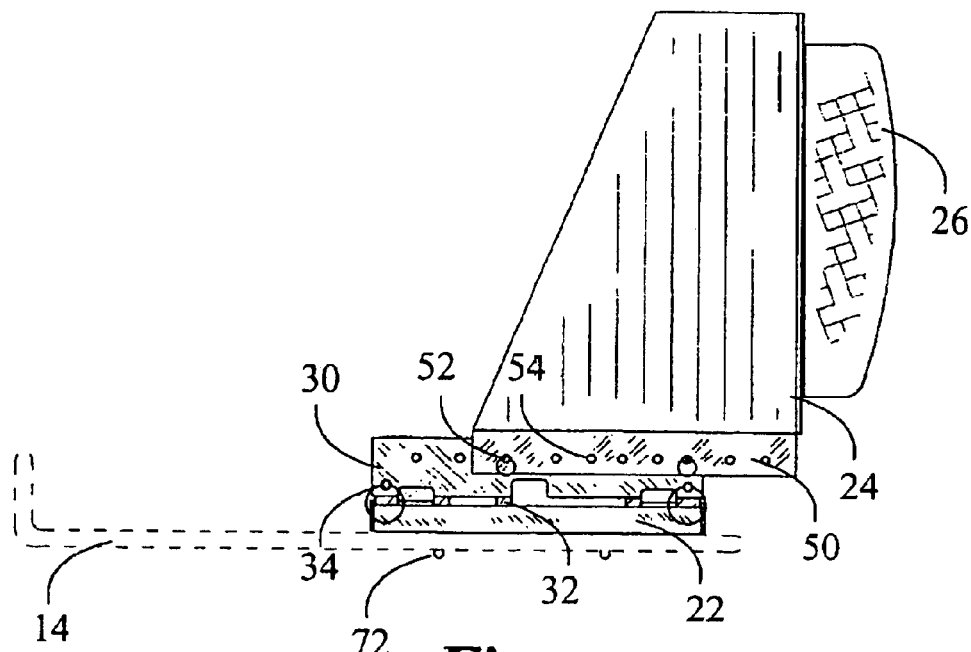
FIG. 24 is a right side view of a back support according to the embodiment of FIG. 16 adjusted toward the front.
Figure 25:
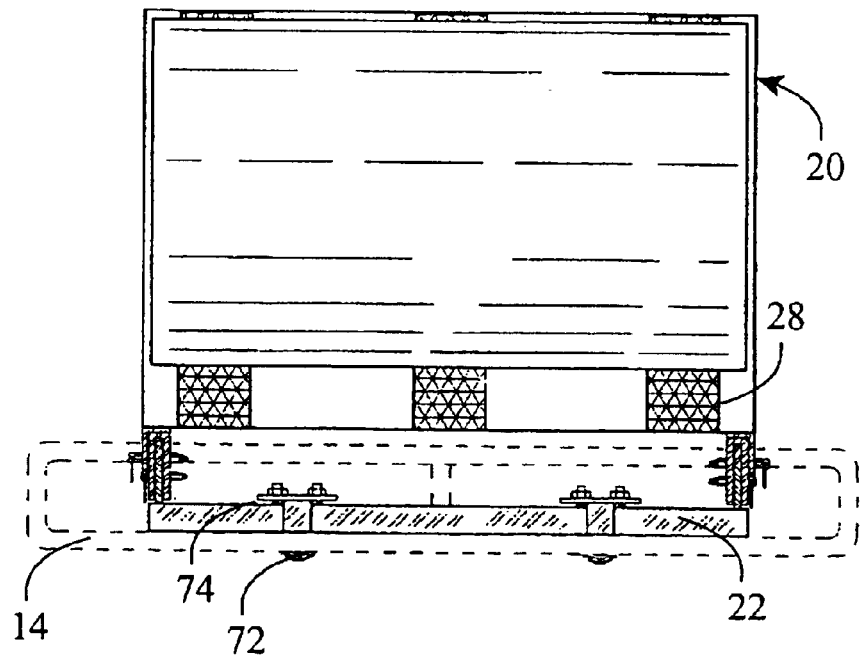
FIG. 25 is a front view of a back support according to the embodiment of FIG. 24.

To enable selective adjustment of the spacing between the seat 16 and the back support 20, the back support 20 is optionally movable along the base and attachable at a plurality of locations. In the optional embodiment of FIG. 16, this is accomplished by providing a plurality of spaced discrete bracket holes 54 that align with a plurality of rail horizontal adjustment holes. As shown in FIG. 24, when the back support 20 has been positioned at the desired spacing from the seat 16, the bracket holes 54 and rail horizontal adjustment holes 56 are secured using a fastener such as a bolt, pin, detent ring pin 52, or other fastener. It is noted that a similar embodiment may use a track (not shown) in which the back support 20 may slide and selectively lock to thereby permit the spacing between the back support 20 and seat 16 to be selectively adjusted.

As with the angle adjustment, in an alternate optional embodiment, the adjustment of the spacing between the seat 16 and the back support 20 may be continuous. That is, in an optional embodiment, the bracket 50 and rail 30 may be attachable over a continuous range of locations. In the optional embodiment of FIG. 19–20, the bracket 50 includes a slot 60 that aligns with a hole 62 in the rail 30. The bracket 50 and rail 30 are attached using pins, bolts, screw knobs 64 cooperating with a fixed nut 66, or other fastener. Thus, in an optional embodiment, the spacing of between the seat 16 and the back support 20 may be selectively adjusted by loosening the fastener thereby permitting the back support 20 to move relative the base 22, and thus the seat 16, then tightening the fastener.

Figure 21:
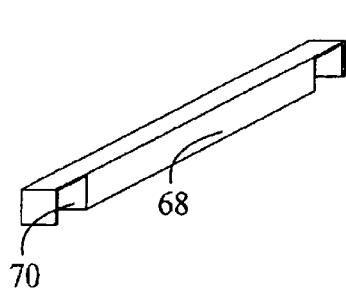
FIG. 21 is an elevated front view of a float mount according to an embodiment of the present invention.
Figure 22:
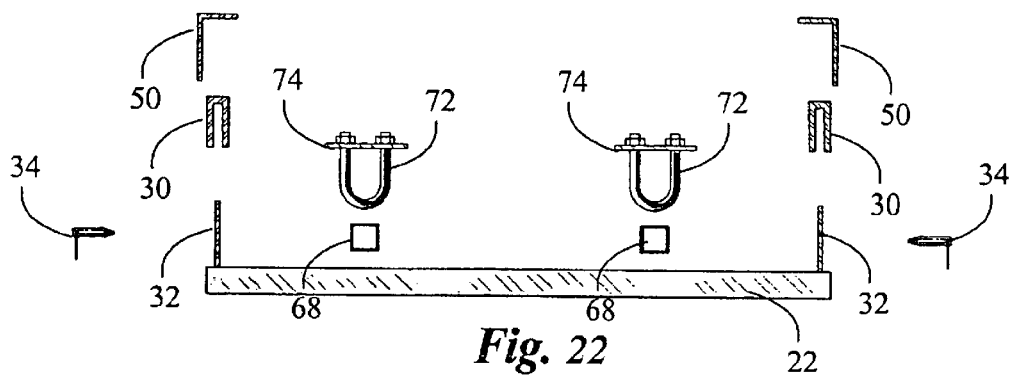
FIG. 22 is a front assembly view of a base, float mounts, fasteners, rail supports, rails, and brackets according to the embodiment of FIG. 16.
Figure 23:
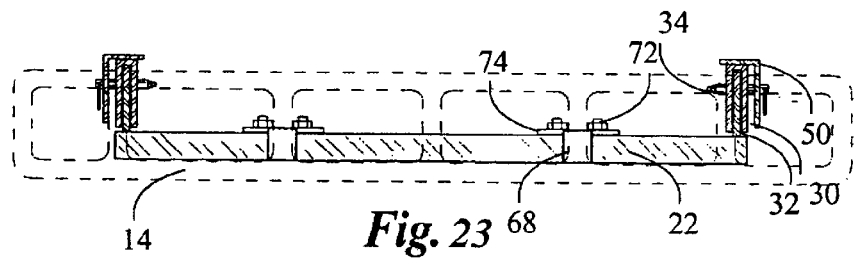
FIG. 23 is a front view of a base, float mounts, fasteners, rail supports, rails, and brackets according to the embodiment of FIG. 16 as assembled.

The base 22 is secured to the rear rack 14. In the optional embodiment of FIGS. 21–23, the base 22 may be secured using float mounts 68 and fasteners. In such an optional embodiment, the float mounts 68 are bars with notched ends 70. The float mounts 68 are positioned over the base 22 with the notched ends 70 fitting over the base 22 in alignment with bars of the rear rack 14. Fasteners, such as U-bolts 72 cooperating with compression plates 74, are secured over the float mounts 68 and under the bars of the rear rack 14 thereby sandwiching the base 22 between the float mounts 68 and the rear rack 14.

Figure 26:
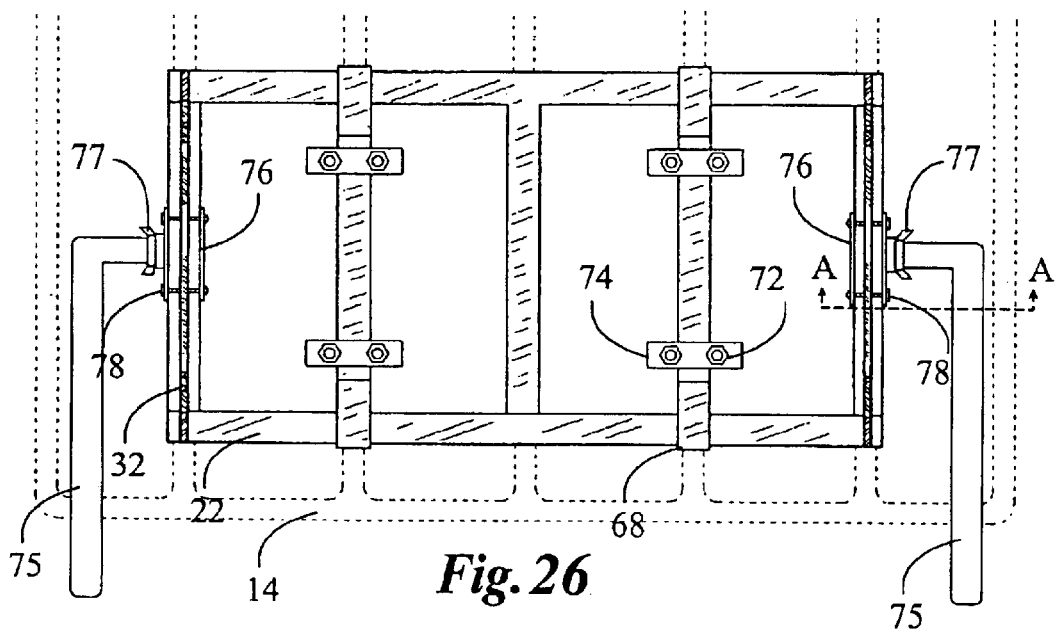
FIG. 26 is a top view of a base, grip mount, and grip according to an embodiment of the present invention.
Figure 27:
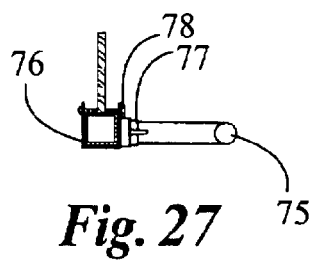
FIG. 27 is a cutaway sectional view along section line A—A of FIG. 26.

In an optional embodiment, the back support 20 may further include grip handles 75. As shown in FIGS. 26–27, the grip handles 75 attach to grip mounts 76 that attach to the base 22. Optionally, the grip mounts 76 are U-shaped and mate with the base 22. In such an optional embodiment, the U-shaped grip mounts 76 are secured using fasteners such as bolts 78 clamping the grip mounts to the base 22. In an optional embodiment, the grip handles 75 are threaded and couple to the grip mounts 76 through fasteners such as wing nuts 77. Alternatively, the grip handles 75 may mate with the grip mounts 76 and ball detents (not shown) could be used to adjust the length of the grip and/or the distance the grip handles 75 extend from the grip mounts 76.

While certain embodiments of the present invention have been shown and described it is to be understood that the present invention is subject to many modifications and changes without departing from the spirit and scope of the claims presented herein.

I claim:

1. A device for an all terrain vehicle of the type including a seat in front of a rear rack, comprising:
    a base secured to said rear rack;
    a rail support fixed to said base;
    a rail selectively attached to said rail support, the height and angle of said rail with respect to said rail support and said base being selectively adjustable by selectively attaching said rail to said rail support at any of a plurality of vertically spaced locations along said rail support; and
    a back support attached to said rail such that the angle of said back support with respect to said base is selectively adjusted by changing the vertical location at which the rail attaches to said rail support.

2. The device of claim 1, further comprising:
    a bracket fixed to said back support, said bracket attachable to said rail at a plurality of locations such that the spacing between said back support and said seat is selectively adjusted by changing the location at which the bracket attaches to said rail, said spacing between said back support and said seat selectively adjustable independent of the selective adjustment of the height and angle of said rail with respect to said rail support.

3. The device of claim 1 further comprising:
    float mounts selectively positionable over said base; and
    fasteners securing said float mounts to said rear rack to hold said base to said rear rack.

4. The device of claim 1 wherein said rail is attachable to said rail support at two or more discrete locations.

5. The device of claim 1 wherein said rail is attachable to said rail support through a continuous range of locations.

6. The device of claim 1 further comprising:
    a grip mount attached to said base; and
    a grip handle attached to said grip mount.

7. A device for an all terrain vehicle of the type including a seat in front of a rear rack, comprising:
    a base secured to said rear rack;
    a rail support fixed to said base;
    a rail selectively attached to said rail support, the height and angle of said rail with respect to said rail support and said base being selectively adjustable by selectively attaching said rail to said rail support at any of a plurality of vertically spaced locations along said rail support;
    a bracket attached to said rail; and
    a back support fixed to said bracket such that the angle of said back support with respect to said base is selectively adjusted by changing the vertical location at which the rail attaches to said rail support.

8. The device of claim 7 wherein said rail is attachable to said rail support at two or more discrete locations.

9. The device of claim 7 wherein said rail is attachable to said rail support through a continuous range of locations.

10. The device of claim 7 wherein said bracket is attachable to said rail at two or more discrete locations such that the spacing between said back support and said seat is selectively adjusted by changing the location at which the bracket attaches to said rail, said spacing between said back support and said seat selectively adjustable independent of the selective adjustment of the height and angle of said rail with respect to said rail support.

11. The device of claim 7 wherein said bracket is attachable to said rail through a continuous range of locations such that the spacing between said back support and said seat is selectively adjusted by changing the location at which the bracket attaches to said rail, said spacing between said back support and said seat selectively adjustable independent of the selective adjustment of the height and angle of said rail with respect to said rail support.

12. The device of claim 7 further comprising:
    float mounts selectively positionable over said base; and
    fasteners securing said float mounts to said rear rack to hold said base to said rear rack.

13. The device of claim 7 further comprising:
    a grip mount attached to said base; and
    a grip handle attached to said grip mount.

14. A device for an all terrain vehicle of the type including a seat in front of a rear rack, comprising:
    a base;
    float mounts selectively positionable over said base;
    fasteners securing said float mounts to said rear rack to hold said base to said rear rack;
    a rail support fixed to said base;
    a rail movable with respect to said base attached to said rail support, the height and angle of said rail with respect to said rail support and said base being selectively adjustable by selectively attaching said rail to said rail support at any of a plurality of vertically spaced locations alone said rail support;
    a bracket attached to said rail, said bracket attachable to said rail at a plurality of locations along said rail; and
    a back support fixed to said bracket such that the height and angle of said back support with respect to said base is selectively adjusted by changing the vertical location at which the rail attaches to said rail support and the spacing between said back support and said seat is selectively adjusted by changing the location at which the bracket attaches to said rail, said spacing between said back support and said seat selectively adjustable independent of the selective adjustment of the height and angle of said rail with respect to said rail support.

15. The device of claim 14 wherein said rail is attachable to said rail support at two or more discrete locations.

16. The device of claim 14 wherein said rail is attachable to said rail support through a continuous range of locations.

17. The device of claim 14 wherein said bracket is attachable to said rail at two or more discrete locations.

18. The device of claim 14 wherein said bracket is attachable to said rail through a continuous range of locations.

19. The device of claim 14 further comprising:
    a grip mount attached to said base; and
    a grip handle attached to said grip mount.

* * * * *